(12) United States Patent
Denton et al.

(10) Patent No.: US 7,937,475 B2
(45) Date of Patent: May 3, 2011

(54) METHOD FOR FAIR SHARING LIMITED RESOURCES BETWEEN MULTIPLE CUSTOMERS

(75) Inventors: Brian T. Denton, Winooski, VT (US);
Robert J. Milne, Fishkill, NY (US);
Chi-Tai Wang, Quebec (CA)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 12/125,193

(22) Filed: May 22, 2008

(65) Prior Publication Data

US 2008/0221962 A1 Sep. 11, 2008

Related U.S. Application Data

(63) Continuation of application No. 10/707,972, filed on Jan. 29, 2004, now Pat. No. 7,383,337.

(51) Int. Cl.
*G06F 15/173* (2006.01)
(52) U.S. Cl. .................................................. 709/226
(58) Field of Classification Search .................. 709/227, 709/228, 226, 213–214
See application file for complete search history.

(56) References Cited

U.S. PATENT DOCUMENTS

| | | | |
|---|---|---|---|
| 5,093,794 | A | 3/1992 | Howie et al. |
| 5,233,533 | A | 8/1993 | Edstrom et al. |
| 5,943,484 | A | 8/1999 | Milne et al. |
| 5,971,585 | A | 10/1999 | Dangat et al. |
| 6,088,626 | A | 7/2000 | Lilly et al. |
| 6,151,582 | A | 11/2000 | Huang et al. |
| 6,498,786 | B1 * | 12/2002 | Kirkby et al. ................. 370/322 |
| 6,701,201 | B2 | 3/2004 | Hegde et al. |
| 6,898,472 | B2 | 5/2005 | Crampton et al. |

(Continued)

FOREIGN PATENT DOCUMENTS

EP 0 425 405 A2 5/1991

(Continued)

OTHER PUBLICATIONS

Moodie, D., "Demand Management: The Evaluation of Price and Due Date Negotiation Strategies Using Simulation," Production and Operations Management, vol. 8, No. 2, Summer 1999, pp. 151-162.

(Continued)

*Primary Examiner* — Frantz B Jean
(74) *Attorney, Agent, or Firm* — Gibb I.P. Law Firm, LLC; Richard M. Kotulak, Esq.

(57) ABSTRACT

The invention disclosed comprises a method for encouraging fair sharing of limited material inventory and capacity between multiple customers when creating a production plan the invention allocates resources among competing demands in a linear programming production planning system by first classifying the demands into fair share sets, wherein all demands within each set have the same priority, calculating the cumulative demand for each resource within each set, and then allocating the resources to the demands in order of fair share set priority. If, during the allocating process, the supply of a given resource cannot satisfy a given cumulative demand of a given set, the given resource is allocated proportionally (e.g., evenly or according to usage proportions) among all demands that contribute to the given cumulative demand within the given set. This is an advanced planning system for optimizing established planning objectives (e.g., customer service, short lead times, low inventory, and prioritized allocation of supply and capacity) to compute a feasible production plan for the enterprise.

17 Claims, 4 Drawing Sheets

U.S. PATENT DOCUMENTS

| | | | |
|---|---|---|---|
| 7,164,959 | B2 | 1/2007 | Huang et al. |
| 7,197,469 | B2 | 3/2007 | Hegde et al. |
| 7,464,147 | B1 | 12/2008 | Fakhouri et al. |
| 2002/0133387 | A1 | 9/2002 | Wilson et al. |
| 2002/0188499 | A1 | 12/2002 | Jenkins et al. |
| 2002/0198757 | A1 | 12/2002 | Hegde et al. |
| 2003/0065415 | A1 | 4/2003 | Hegde et al. |
| 2003/0149631 | A1 | 8/2003 | Crampton et al. |
| 2003/0208392 | A1* | 11/2003 | Shekar et al. ............ 705/8 |
| 2004/0030428 | A1 | 2/2004 | Crampton et al. |
| 2005/0144056 | A1 | 6/2005 | Wang et al. |

FOREIGN PATENT DOCUMENTS

EP           0425405 A2     5/1991

OTHER PUBLICATIONS

Wang et al., "Earliness/Tardiness Production Planning Approaches with Due-Window for Manufacturing Systems." Computers in Industrial Engineering, 34:4 (1998), pp. 825-836.

Fang et al. "A Rolling Horizon Job Shop Rescheduling Strategy in the Dynamic Environment." International Journal of Advanced Manufacturing Technology, 13 (1997), pp. 227-232.

Potts et al., "Single Machine Scheduling to Minimize Total Late Work." Operations Research, 40:3 (1992), pp. 586-595.

Wang et al., "JIT Production Planning Approach with Fuzzy Due Date for OKP Manufacturing systems." International Journal of Production Economics, 58 (1999), pp. 209-215.

Denton et al. U.S. Appl. No. 10/707,974, BUR920040009US1, Office Action Communication, Jan. 22, 2009, 13 pages.

Denton et al., U.S. Appl. No. 10/707,974, BUR920040009US1, Office Action Communication, Jul. 20, 2009, 9 pages.

Kern et al., "Master Production Rescheduling Policy in Capacity-Constrained Just-In-Time Make-To-Stock Environments", Decision Sciences, Spring 1996, vol. 27, Issue 2, ABI/INFORM Global, p. 365-387.

Denton et al., U.S. Appl. No. 10/707,977, Office Action Communication, Nov. 18, 2009, 17 pages.

Denton et al., U.S. Appl. No. 10/707,979, Office Action Communication, Jan. 8, 2010, 21 pages.

de Farias, D., "The Linear Programming Approach to Approximate Dynamic Programming: Theory and Application," Dissertation, Stanford University, Jun. 2002.

Leachman, R., et al., "IMPReSS: An Automated Production-Planning fi and Delivery-Quotation System at Harris Corporation—Semiconductor Sector," Interfaces vol. 26, No. 1, 1996.

de Farias, D., et al., "The Linear Programming Approach to Approximate Dynamic Programming," Operations Research, vol. 51, No. 6, Nov.-Dec. 2003, pp. 850-865.

Leachman et al., "Impress: An Automated Production Planning and Delivery-Quotation System at Harris Corporation Semiconductor Sector", Interfaces vol. 26:1, p. 6-37, 1996.

Nemhauser et al., "Integer and Combinatorial Optimization", Chapter 2—Linear Programming, p. 27-41, 1999.

G. Dantizig, "Linear Programmings and Extensions", Princeton University Press, p. 448-455, 1963.

Denton et al., U.S. Appl. No. 10/070,979, Office Action Communication, Aug. 4, 2009, 26 Pages.

de Farias, D., "The Linear Programming Approach To Approximate Dynamic Programming: Theory and Applicaiton," Jun. 2002, 44 pages.

Leachman, et al., "IMPReSS: An Automated Production-Planning and Delivery-Quotation System at Harris Corporation-Semiconductor Sector," Interfaces 26: Jan. 1-Feb. 1996, pp. 6-37.

Denton et al., U.S. Appl. No. 12/434,733, Notice of Allowance, Apr. 12, 2010, 9 pages.

Chen et al., "Quantity and Due Date Quoting Available to Promise," Information Systems Frontiers, vol. 3, Issue 4, pp. 477-488, 2001.

Wang et al., "Soft Computing for Multicustomer Due-Date Bargaining," IEEE Transactions on Systems, Man and Cybernetics Part C: Applications and Reviews, vol. 26, No. 4, Nov. 1999.

Hegedus et al., "Due Date Setting with Supply Constraints in Systems Using MRP," Computers & Industrial Engineering 39, pp. 293-305, 2001.

Denton et al., U.S. Appl. No. 10/707,979, Office Action, May 13, 2010, 21 pages.

Hung, et al., "A Production Planning Methodology for Semiconductor Manufacturing Based on Iterative Simulation and Linear Programming Calculations," IEEE Transactions on Semiconductor Manufacturing, vol. 9, No. 2, May 1996, pp. 257-269.

Lyon, et al., "Matching Assets with Demand in Supply-Chain Management at IBM Microelectronics," Interfaces 31: Jan. 1-Feb. 2001 (pp. 108-124).

Nagarur, et al., "Production Planning and Scheduling for Injection Moulding of Pipe Fittings," A Case Study, Int. J. Production Economics 53, 1997, pp. 157-170.

Denton et al., U.S. Appl. No. 10/707,974, Office Action Communication, Mar. 4, 2010, 10 pages.

Denton et al., U.S. Appl. No. 10/707,974, Office Action Communication, Sep. 15, 2010, 10 pages.

Denton et al., U.S. Appl. No. 10/707,977, Office Action Communication, Mar. 18, 2009, 10 Pages.

Karabuk, et al. "Coordinating Strategic Capacity Planning in the Semiconductor Industry". Operations Research, vol. 51, No. 6, Nov.-Dec. 2003, pp. 839-849.

Chen, H. et al., "A Lagrangian Relaxation Approach for Supply Chain Planning with Order/Setup Costs and Capacity Constraints". Journal of Systems Science and Systems Engineering, vol. 12, No. 1, pp. 98-110, Mar. 2003.

Eksioglu, S. "Optimizing Integrated Production, Inventory and Distribution Problems in Supply Chains". A Dissertation, University of Florida, 2002.

George B. Dantzig, G.B., et al. "Decomposition Principle for Linear Programs", Operations Research, vol. 8, No. 1 (Jan.-Feb. 1960), pp. 101-111.

Denton et al., U.S. Appl. No. 10/707,979, Office Action Communication, Oct. 12, 2010, 17 pages.

de Farias, D., "The Linear Programming Approach to Approximate Dynamic Programming: Theory and Application," Dissertation, Stanford University, Jun. 2002.

Leachman, et al., "IMPReSS: An Automated Production-Planning and Delivery-Quotation System at Harris Corporation-Semiconductor Sector," Interfaces vol. 26, No. 1, 1996.

de Farias, D., et al., "The Linear Programming Approach to Approximate Dynamic Programming," Operations Research, vol. 51, No. 6, Nov.-Dec. 2003, pp. 850-865.

Yi- Feng Hung, "A Production Planning Methodology for Semiconductor Manufacturing Based on Iterative Simutaltin and Linear Programming Calculations," IEEE transactions on Semiconductor Manufacturing, vol. 9, No. 2, May 1996.

Nagarur, et al, "Production Planning and Scheduling for injection moulding of pipe Fittings A case Study," Int. J.—Production Economics 53 (1997) 157-170.

Lyon, et al, "Matching Assets with Demand in Supply-Chain Management at IBM Microelectronics," Interfaces 31:1 Jan.-Feb. 2001, pp. 108-124.

* cited by examiner

METHOD FOR FAIR SHARING LIMITED RESOURCES BETWEEN MULTIPLE CUSTOMERS

CROSS REFERENCE TO RELATED APPLICATIONS

This application is a Continuation of U.S. application Ser. No. 10/707,972 filed Jan. 29, 2004, the complete disclosure of which, in its entirety, is herein incorporated by reference.

The present application is related to pending U.S. patent application Ser. No. 10/707,978, filed concurrently herewith to Denton et al., entitled "A METHOD FOR SUPPLY CHAIN COMPRESSION"U.S. patent application Ser. No. 10/707,974, filed concurrently herewith to Denton et al., entitled "METHOD FOR PURCHASE ORDER RESCHEDULING IN A LINEAR PROGRAM"; U.S. patent application Ser. No. 10/707,977, filed concurrently herewith to Denton et al., entitled "A Method for Supply Chain Decomposition"; U.S. patent application Ser. No. 10/707,976, filed concurrently herewith to Denton et al., entitled "A METHOD FOR OPTIMIZING FOUNDRY CAPACITY"; U.S. patent application Ser. No. 10/707,979, filed concurrently herewith to Denton et al., entitled "A METHOD FOR CONSIDERING HIERARCHICAL PREEMPTIVE DEMAND PRIORITIES IN A SUPPLY CHAIN OPTIMIZATION MODEL"; U.S. patent application Ser. No. 10/707,973, filed concurrently herewith to Denton et al., entitled "Method for Simultaneously Considering Customer Commit Dates and Customer Request Dates"; and U.S. patent application Ser. No. 10/708,119, filed concurrently herewith to Orzell et al., entitled "METHOD FOR IDENTIFYING PRODUCT ASSETS IN A SUPPLY CHAIN USED TO SATISFY MULTIPLE CUSTOMER DEMANDS". The foregoing applications are assigned to the present assignee, and are all incorporated herein by reference.

BACKGROUND OF INVENTION

The present invention relates to computer implementable decision support systems for determining a production plan in a manner which fairly allocates limited resources among multiple customers. General methodologies within this field of study include advanced planning systems, optimization and heuristic based algorithms, constraint based programming, and simulation.

DESCRIPTION OF THE RELATED ART

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers" demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming.

The below-referenced U.S. patents disclose embodiments that were satisfactory for the purposes for which they were intended. The disclosures of both the below-referenced prior U.S. patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 5,943,484, "Advanced material requirements planning in microelectronics manufacturing," Aug. 24, 1999; and Nemhauser, G. L. and Wolsey, L. A., 1999, Wiley, Integer and Combinatorial Optimization.

SUMMARY OF INVENTION

In view of the foregoing and other problems and drawbacks of conventional systems and methods, the present invention provides a method and system for determining a production plan comprising a fair sharing allocation when multiple part numbers are to be shared among customers. The present invention encourages fair sharing within the context of a linear program and maintains fair share parameters according to a family hierarchy.

More specifically, the invention adds equations to a production planning linear program so that demand of equal priority will be satisfied "fairly" (proportionately). The user classifies demand(s) into "fair share sets" to specify which demand(s) should be subject to fair share. A novel set of constraints is created for each demand which keeps track of the percentage of that demand which is unsatisfied and in conjunction with similar equations for the other demands in the setidentifies the maximum proportion of demand unsatisfied by all demand elements in the fair share set. Encouraging a small maximum percentage (through the application of cost penalties) encourages a fair share allocation.

In other words, the invention provides a method for determining a production plan that creates a constraint that proportionally shares limited resources among competing demands of equal priority and then applies the constraint using a linear program to create a production plan. This process creates an objective function coefficient that encourages proportional sharing of the limited resources through the penalization of the largest percentage of cumulative demand backordered of those demand elements in a user specified set. The invention also provides proportional sharing across multiple levels of a bills of materials supply chain and provides proportional sharing that considers multiple demands made on a single resource. The invention classifies the demands into sets based on demand family hierarchy and/or demand priorities.

Thus, the invention allocates resources among competing demands in a linear programming production planning system by first classifying the demands into fair share sets, wherein all demands within each set have the same priority, calculating the cumulative demand for each resource within each set, and then allocating the resources to the demands in order of fair share set priority. If, during the allocating process, the supply of a given resource cannot satisfy a given cumulative demand of a given set, the given resource is allocated proportionally (e.g., evenly or according to usage proportions) among all demands that contribute to the given cumulative demand within the given set.

This inventive process is time period dependent and simultaneously allocates multiple resources to multiple demands. The invention encourages proportional sharing by imposing penalties for non-proportional sharing. The fair share sets identify parts, priority level, locations, and timing information. During the allocating process, higher priority fair share sets are fully satisfied with a resource before lower priority sets receive any of that resource.

DETAILED DESCRIPTION

In situations of limited material assets and capacity, it is desirable to allocate limited supply "fairly" (proportionately) across demands of equal priority. This is sometimes referred to as "sharing the pain." One possible method (ref. U.S. Patent Application 2002198757) tackles the challenge of sharing multiple component items by dividing each assembly manufacturing release schedule into "N" separate release schedules. In this method, the size of the integer N can impact the quality of the fair sharing and the run time of the method. If N is too low, then the original release is divided into coarse chunks leading to a potentially unfair sharing. On the other hand, if N is too high, then run time suffers. Further conventional applications address the fair sharing of supply at a single point in the bills of materials supply chain and do not address fair sharing of supply across multiple levels of the bills of materials supply chain. Also, no known conventional system addresses fair sharing within the context of a linear program used for determining a production plan.

To contrast the present invention, a conventional production planning linear program "LP" is shown below (such as that described in U.S. Pat. No. 5,971,585, which is incorporated herein by reference). This LP makes decisions including: production starts, material substitutions, and shipments planned to customers, between manufacturing and distribution locations, and from vendor suppliers. A LP is composed of an objective function that defines a measure of the quality of a given solution, and a set of linear constraints. The types of equations used in production planning models are well know to those practiced in the art and include: (1) Material Balance Constraints, which ensure conservation of material flow through the network of stocking points comprising the supply chain.

(2) Capacity Constraints, which ensure that the capacity available for manufacturing activities is not exceeded.

(3) Backorder Conservation Constraints, which balance the quantity of a given part backordered in a given planning period with the quantity backordered in the previous planning period and the net of new demand and new shipments.

(4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

Definition of Subscripts $j$—time period $m$—material (part number)

$a$—plant location within the enterprise $n$—material being substituted $z$—group (which represents a family or collection of part numbers)

$e$—process (a method of purchasing or manufacturing a material at a plant)

$v$—receiving plant location $k$—demand center (i.e., customer location) (Note: the set of customer locations is mutually exclusive from the set of plant locations)

$q$—demand class which indicates relative priority $w$—resource capacity which could be a machine, labor hour, or other constraint $u$—represents a consumer location which refers to an internal plant, external demand center, or to a generic indicator meaning any plant/or demand center Definition of Objective Function Coefficients $PRC_{jmae}$—cost of releasing one piece of part m during period j at plant a using process e $SUBC_{jmna}$—substitution cost per piece of part number n which is being substituted by part number m during period j at plant a $TC_{jmav}$—transportation cost per piece of part number m leaving plant a during period j which are destined for plant v $INVC_{jma}$—inventory cost of holding one piece of part number m at the end of period j at a particular plant a $DMAXC_{jzau}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $BOC_{jmkq}$—backorder cost of one piece of part m at the end of period j for class q demand at customer location k Definition of Constants $DEMAND_{jmkq}$—demand requested during time period j for part number—m at customer location k for demand class q $RECEIPT_{jma}$—quantity of projected wip and purchase order receipts for part number m expected to be received at plant a during time period j $CAPACITY_{jaw}$—Capacity of resource w available at plant a during period j to support production starts $CAPREQ_{jmaew}$—Capacity of resource w required for part number m at plant a for process e during period j $QTYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—Cycle time. The number of periods between the release and completion of part m jobs for releases made using process e at plant a during time period j TT mav—transport time for part number m from plant a to plant v Definition of LP Decision Variables I jma—Inventory at the end of period j for part number m at a particular plant a P jmae—Production starts of part m during period j at plant a using process e L jmna—Quantity of part number n which is being substituted by part number m during period j at plant a T jmav—Internal shipments of part number m leaving plant a during period j which are destined for plant v F jmakq—Shipments of part number m leaving plant a during period j and satisfying class q demand at external customer k B jmkq—Back orders of part m at the end of period j for class q demand at customer location k H jzu—Total shipments of group z (z is a "collection" of parts) leaving suppliers during period j to support consumption at consuming location(s) u S jzau—Amount by which total shipments of parts in z from plant a to consuming location(s) u during period j exceeds the maximum amount specified as desired in the sourcing rules G jzau—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:

Minimize:

$$\sum_j \sum_m \sum_a \sum_e PRC_{jmae} P_{jmae} +$$

$$\sum_j \sum_m \sum_n \sum_a SUBC_{jmna} L_{jmna} + \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + \sum_j \sum_m \sum_k \sum_q BOC_{jmkq} B_{jmkq}$$

Subject to:

Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) + G_{jzau} \geq MINPCT_{jzau} H_{jzu}$$

Capacity Constraints:

$$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{x \leq i \cdot t \\ x + CTxmae=j}} \sum_e YIELD_{xmae} * P_{xmae} +$$

$$\sum_n L_{jmna} + \sum_{\substack{x \leq i \cdot t \\ x + TTmav=j}} \sum_v T_{xmva} - \sum_n SUBQTY_{jmna} * L_{jmna} -$$

$$\sum_v T_{jmav} - \sum_k \sum_q F_{jmakq} - \sum_{\substack{n \text{ s.t. } m \\ \text{is a component} \\ \text{of } n}} \sum_e QTYPER_{jmaen} P_{jnae}$$

Non-Negativity Constraints:

all Xij ... $\geq 0$, where X is a generic decision variable and i, j etc. represent generic subscripts.

In the supply chain linear programming model shown above, situations can arise where customer demands cannot be satisfied in their entirety at the time specified by the customers. For instance, capacity constraints may limit production starts and result in restricting the satisfaction of customer demand. In such cases demand is typically "backordered" and delivered as soon as possible, given the tradeoff of satisfying different types (designated by a "demand class") of demand. When multiple customers are considered in a supply chain planning application, situations arise in which customers with the same demand class cannot have their demand satisfied due to capacity constraints. In these cases, it is desirable to share the shortage among the customers rather than preferentially provide one customer with a complete order and one with a substantially under-filled order. This sharing is often referred to as "fair sharing." This inventive rule approach detailed below could also be used to "fair share" other variables in the above supply chain model such as Production, Shipments, etc.

Figure 1:
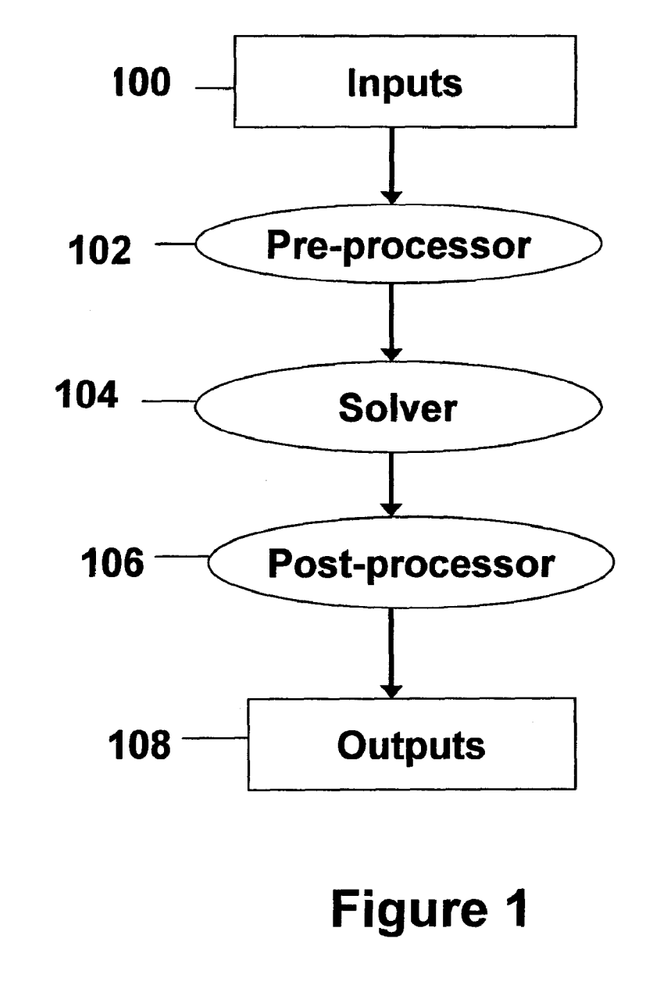
FIG. 1: Overview of the structure of a typical linear programming application.

The linear programming application shown in FIG. 1 includes the transformation of input files (block 100) into output files (block 108) through a pre-processor (block 102), solver (block 104) and post-processor (block 106). The pre-processor (block 102) transforms the raw input files into a form useable by the linear programming solver. The solver (block 104) determines an optimal raw output solution which is transformed by the post-processor (block 106) into a format acceptable for usage. The present invention is embedded in the pre-processor stage (block 102) and is used to create a constraint type and objective coefficient to encourage fair sharing.

Figure 2:
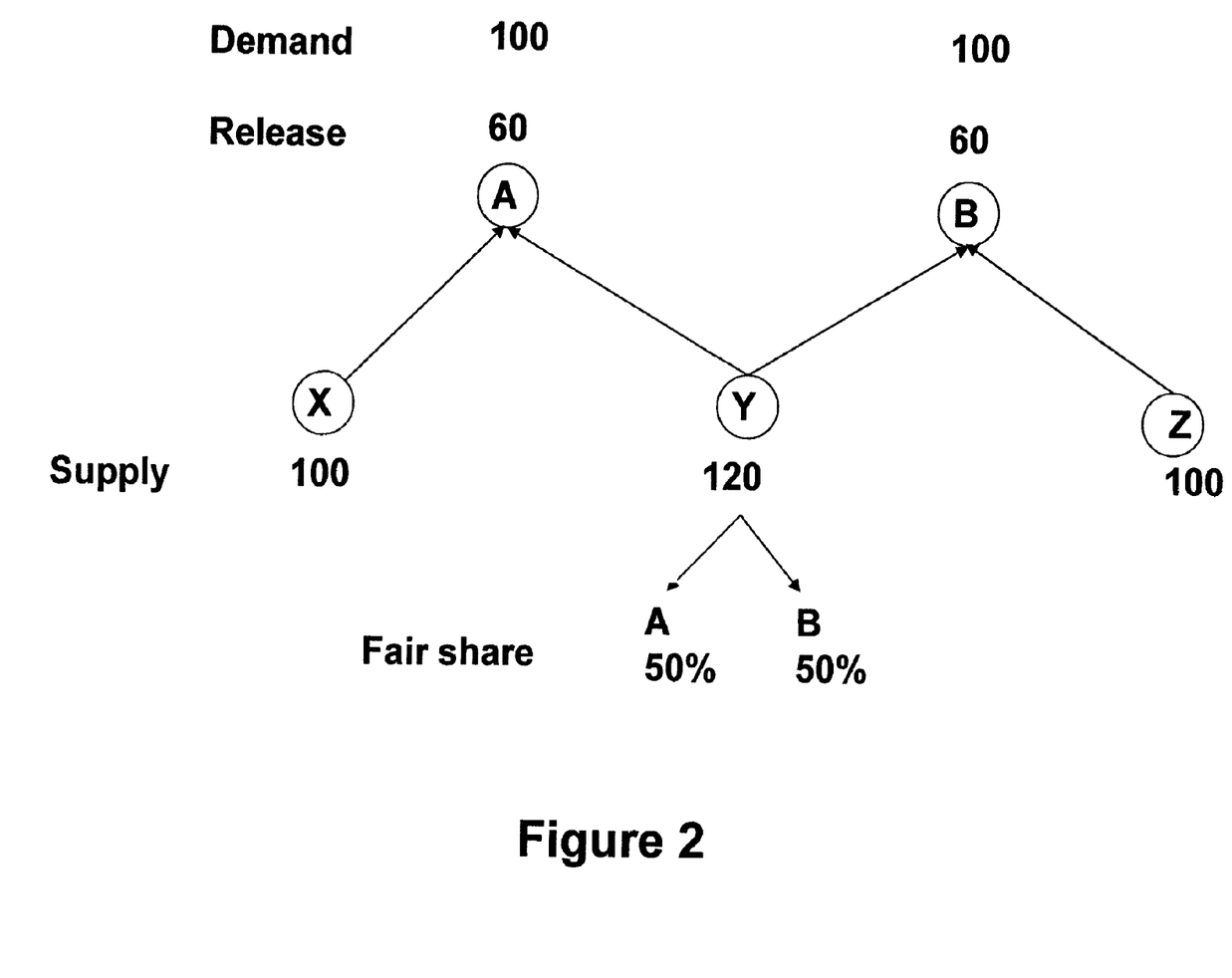
FIG. 2: Example illustrating fair sharing among two customers.

FIG. 2 illustrates an example of fair sharing. In this example, there is a demand of 100 pieces each for assembly parts A and B. These parts share a common component part, Y, which has a supply limited to 120 pieces. Since the total demand of 200 cannot be satisfied on time, the figure illustrates a fair share allocation wherein 50% of the supply of Y is allocated to releases of part A and likewise 50% allocated to part B. This allocation supports releases of 60 pieces of both parts A and B. Consequently, parts A and B are each able to satisfy 60% of their demand. If the demands for A and B are of equal priority, this fair share allocation (each part gets 60%) is preferable to an allocation where one part receives less than its fair share.

Figure 3:
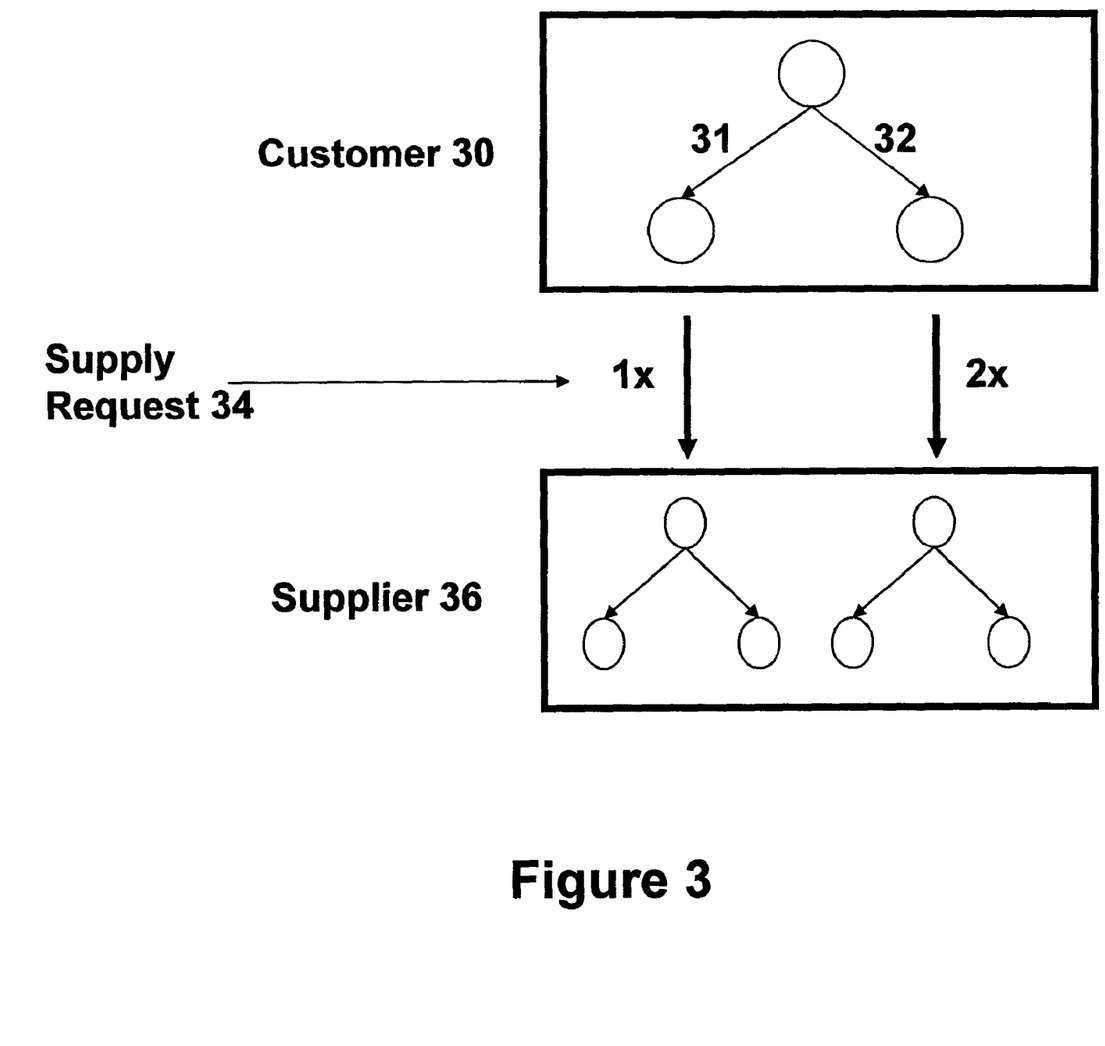
FIG. 3: Illustration of coordination between a customer and its supplier.

FIG. 3 illustrates a possible interaction between a customer and its supplier and the corresponding need for a fair share allocation. In FIG. 3, the customer (30) consumes one (32) of its two components at twice the rate of the other (31). Consequently, the customer 30 will typically place these demands 31, 32 (using a supply request 34) on the supplier 36 in a one-to-two ratio (1× vs 2×). In situations of limited supplier capability, it is desirable for the supplier 36 to satisfy those demands in a one-to-two ratio in terms of quantity or equivalently satisfy the same percentage of demand for each of the parts ordered. This fair share allocation will enable the customer to make full use of the parts received since they will be delivered in complete sets and achieve greater customer satisfaction. With the invention, if the supply of a given resource cannot satisfy a given demand, the given resource is allocated proportionally (e.g., evenly or according to usage proportions) among all demands. Having thus described the motivation for fair sharing, FIG. 4 shows some of the inventive details for delivering a fair share allocation of supply within the context of a linear programming application.

Figure 4:
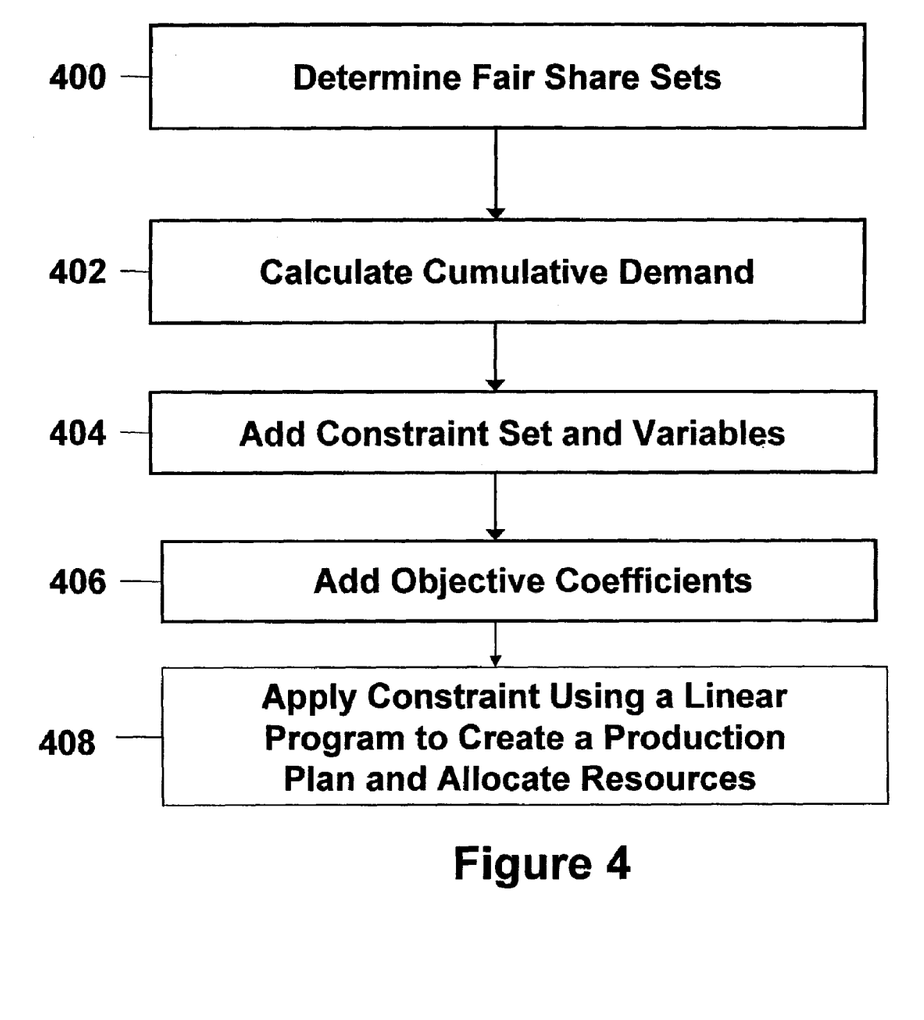
FIG. 4: Summary of the major steps of the invention.

Thus, FIG. 4 outlines one embodiment of the invention. Block 400 determines sets of demands that should be fairly shared. That is, within each fair share set, the LP will encourage limited resources (capacity, inventory) to be allocated so that the demands within the set are satisfied proportionately to the volume of the demands. Because not all demands are of equal priority, it is desirable to have multiple fair share sets. In general, a fair set may contain demands for any number or combination of part.

The user provides a file or other input that designates how the demands are to be grouped into sets. The invention classifies the demands into fair share sets based on demand family hierarchy and/or demand priorities. Thus, each record of this fair share input file may, for example, contain: a part number or family indicating a collection or grouping of part numbers within the set; customer location; from_demand_class_priority and to_demand_class_priority (possibly the same); effective start dates and end dates; a set identifier; and a fair share penalty value which penalizes the maximum percentage of unsatisfied demand of those demands in the set. If the file contains a blank part/family, the invention presumes that the fair share set applies to all parts. In other words, a blank part/family is treated as a "wildcard" indicating that all parts are included in the fair share set. Similarly, if the customer location field is blank, the record applies to all customer locations. If the start date is blank, the default is to behave as if an infinitely early start date was given. If the end date is blank, the default is to behave as if a date infinitely far into the future was given.

In one embodiment, block 400 examines all possible combinations of part m.

The method creates sets which consume common resources and inventory throughout the bills of materials supply chain. Block 402 calculates cumulative demand through period j of material part m for demand class priority q demand at customer location k using the below formula:

$$CD_{jmkq} = \sum_{s=1}^{j} DEMAND_{smkq}$$

Block 404 adds constraints of the below form to ensure that Mjs is at least as large as the largest percentage of cumulative demand backordered for fair share set s in period j.

$$M_{js} \geq B_{jmkq}/CD_{jmkq} \forall k, q \subset s$$

Block 406 uses the penalty from the fair share input file as the coefficient to for Mjs in the objective function of the linear programming formulation. By putting the penalty into the objective function, the LP is encouraged to make the variable Mjs small. Consequently, the net result of blocks 400-406 is that the largest backorder of each fair share set on a percentage of cumulative demand basis is minimized. This leads toward a fair share allocation of material inventory and capacity resources. Exact fair sharing is not assured, but rather, fair sharing is encouraged. The value of the penalty (i.e., the linear program objective function cost coefficient associated with the Msj—variable) in the fair share file indicates the degree of encouragement. In other words, the penalty value associated with the Mjs variable acts to penalize solutions to the linear program that do not represent fair sharing. Consequently, if fair sharing is of relatively high importance, a large penalty value should be used. Conversely, if fair sharing is of relatively low importance, a small penalty value should be used.

Thus, the invention provides a method for determining a production plan that creates a constraint that proportionally shares limited resources among competing demands of equal priority and then applies the constraint using a linear program to create a production plan (block 408). This process creates an objective function coefficient (406) that encourages proportional sharing of the limited resources through the penalization of the largest percentage of cumulative demand backordered of those demand elements in a user specified set. As shown above, the invention also provides proportional sharing across multiple levels of a bills of materials supply chain and provides proportional sharing that considers multiple demands made on a single resource, and classifies the demands into sets based on demand family hierarchy and/or demand priorities.

Thus, the invention allocates resources among competing demands in a linear programming production planning system by first classifying the demands into fair share sets (400), wherein all demands within each set have the same priority, calculating the cumulative demand for each resource within each fair share set (402), and then allocating the resources to the fair share sets in order of set priority (408). If, during the allocating process, the supply of a given resource cannot satisfy a given cumulative demand of a given set, the given resource is allocated proportionally (e.g., evenly or according to usage proportions) among all demands that contribute to the given cumulative demand within the given set.

The present invention can be implemented on an IBM P690 server using the AIX operating system. The steps for implementing the present invention are preferably programmed in C/C++. It should be understood by those of ordinary skill in the art, however, that the present invention is not limited to the above implementation and is independent of the computer/system architecture. Accordingly, the present invention may equally be implemented on other computing platforms, programming languages and operating systems, and also may be hardwired into a circuit or other computational component.

Thus, as shown above, the present invention provides a method and system for determining a production plan comprising a fair sharing allocation when multiple resources are to be shared among customers. The present invention encourages fair sharing within the context of a linear program and maintains fair share parameters according to a family hierarchy.

More specifically, the invention adds equations to a production planning linear program so that demand of equal priority will be satisfied "fairly" (proportionately). The user specifies which demand should be subject to fair share. A novel set of constraints is created for each demand which keeps track of the percentage of the demand which is unsatisfied and in conjunction with similar equations for the other demands in the setidentifies the maximum proportion of demand unsatisfied by all demand elements in the fair share set. Encouraging a small maximum percentage (through the application of cost penalties) encourages a fair share allocation.

While the invention has been described in terms of the preferred embodiments, those skilled in the art will recognize that the invention can be practiced with modification within the spirit and scope of the appended claims.

The invention claimed is:

1. A computer-implemented method for determining a production plan comprising:
    creating, by a computing device, a constraint which proportionally shares limited resources among competing demands of equal priority and an objective function coefficient which encourages proportional sharing of said limited resources through penalties; and
    applying, by said computing device, said constraint and said objective function using a linear program to create a production plan.

2. The method of claim 1, further comprising creating, by said computing device, a constraint and objective function which penalizes the largest percentage of cumulative demand backordered of demand elements in a user specified set.

3. The method of claim 1, wherein said applying process provides proportional sharing across multiple levels of a bill of materials supply chain.

4. The method of claim 1, further comprising classifying, by said computing device, said demands into sets based on at least one of demand family hierarchy and demand priorities.

5. The method of claim 1, wherein said applying process provides proportional sharing that considers multiple demands made on a single resource.

6. The method of claim 1, wherein, if during said allocating process the supply of a resource cannot satisfy a cumulative demand, said resource is allocated proportionally among all demands that contribute to said cumulative demand.

7. A computer-implemented method of allocating resources among competing demands in a linear programming production planning system, said method comprising:
    classifying, by a computing device, said demands into fair share sets, wherein all demands within each fair share set have the same priority;
    calculating, by said computing device, the cumulative demand for each resource within each fair share set; and
    allocating, by said computing device, said resources to said fair share sets in order of fair share set priority,
    wherein, if during said allocating process the supply of a given resource cannot satisfy a given cumulative demand of a given fair share set, said given resource is allocated proportionally among all demands that contribute to said given cumulative demand within said given fair share set.

8. The method in claim 7, wherein said process of calculating cumulative demand is time period dependent.

9. The method in claim 7, wherein said classifying process considers demand family hierarchy relationships.

10. The method in claim 7, wherein said allocating process comprises a linear program that simultaneously allocates multiple resources to multiple demands.

11. The method in claim 7, wherein said fair share sets identify parts, priority level, locations, and timing information.

12. The method in claim 7, wherein during said allocating process, higher priority fair share sets are fully satisfied with a resource before lower priority fair share sets receive any of said resource.

13. A non-transitory computer storage medium readable by a computer tangibly embodying a program of instructions executable by the computer to perform a method of allocating resources among competing demands in a linear programming production planning system, said method comprising:
    classifying said demands into fair share sets, wherein all demands within each fair share set have the same priority;
    calculating the cumulative demand for each resource within each fair share set; and
    allocating said resources to said fair share sets in order of fair share set priority,
    wherein, if during said allocating process the supply of a given resource cannot satisfy a given cumulative demand of a given fair share set, said given resource is allocated proportionally among all demands that contribute to said given cumulative demand within said given fair share set.

14. The non-transitory computer storage medium in claim 13, wherein said process of calculating cumulative demand is time period dependent.

15. The non-transitory computer storage medium in claim 13, wherein said classifying process considers demand family hierarchy relationships.

16. The non-transitory computer storage medium in claim 13, wherein said allocating process comprises a linear program that simultaneously allocates multiple resources to multiple demands.

17. The program storage device in claim 13, wherein said fair share sets identify parts, priority level, locations, and timing information.

* * * * *